(12) United States Patent
Cichan et al.

(10) Patent No.: US 7,720,604 B1
(45) Date of Patent: May 18, 2010

(54) STATIONKEEPING OPTIMIZATION FOR INCLINED ELLIPTICAL SATELLITE ORBIT CONSTELLATIONS

(75) Inventors: Timothy Cichan, Doylestown, PA (US); Mary K. Johnson, Santa Clara, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 913 days.

(21) Appl. No.: 11/442,332

(22) Filed: May 30, 2006

Related U.S. Application Data

(60) Provisional application No. 60/686,286, filed on Jun. 1, 2005.

(51) Int. Cl.
G01C 21/00 (2006.01)
G06F 17/10 (2006.01)

(52) U.S. Cl. .................................. 701/226; 244/158.4
(58) Field of Classification Search .................. None
See application file for complete search history.

(56) References Cited

U.S. PATENT DOCUMENTS

| | | | | |
|---|---|---|---|---|
| 6,055,485 A * | 4/2000 | Eun et al. | .................. | 702/50 |
| 6,198,990 B1 * | 3/2001 | Croom et al. | .................. | 701/13 |
| 7,255,308 B1 * | 8/2007 | Murphy | .................. | 244/158.4 |
| 7,270,299 B1 * | 9/2007 | Murphy | .................. | 244/158.4 |

OTHER PUBLICATIONS

Robert D. Briskman, et al., "S-DARS Broadcast from Inclined, Elliptical Orbits," 52nd International Astronautical Congress (IAF-01-M.5.04), Oct. 2001, Toulouse, France.
Robert A. Nelson, "Visibility, Orbital Perturbation, and Stationkeeping Analysis for Sirius Satellite Radio," 2003 STK User's Conference, May 2003, Chantilly, VA, USA.

* cited by examiner

*Primary Examiner*—Michael J. Zanelli
(74) *Attorney, Agent, or Firm*—McDermott Will & Emery LLP

(57) ABSTRACT

A satellite constellation optimized for stationkeeping fuel consumption is provided. The satellite constellation includes a plurality of satellites, each satellite having a corresponding inclined elliptical orbit, each orbit having an initial right ascension of ascending node ("RAAN") value, a RAAN drift rate, a semi-major axis, an eccentricity, an argument of perigee and an inclination. Each satellite has a fuel consumption value required to maintain the RAAN drift rate, the semi-major axis, the eccentricity, the argument of perigee and the inclination of the corresponding orbit. The initial RAAN value and the RAAN drift rate for each orbit correspond to a minimized fuel consumption value for the satellite having the highest fuel consumption value. The initial RAAN value and RAAN drift rate may be determined by calculating, for each possible data combination of an initial RAAN value for each orbit and a RAAN drift rate for the constellation, a fuel consumption value for each satellite in the constellation, and selecting, from the fuel consumption values thus determined, the data combination corresponding to a lowest fuel consumption for a highest fuel-consuming satellite.

21 Claims, 10 Drawing Sheets

Figure 7A

| # | Initial RAAN$_i$ | Initial RAAN$_j$ | Initial RAAN$_k$ |
|---|---|---|---|
| 1 | 0 | 120 | 240 |
| 2 | 5 | 125 | 245 |
| 3 | 10 | 130 | 250 |
| 4 | 15 | 135 | 255 |
| 5 | 20 | 140 | 260 |
| 6 | 25 | 145 | 265 |
| 7 | 30 | 150 | 270 |
| 8 | 35 | 155 | 275 |
| 9 | 40 | 160 | 280 |
| 10 | 45 | 165 | 285 |
| 11 | 50 | 170 | 290 |
| 12 | 55 | 175 | 295 |
| 13 | 60 | 180 | 300 |
| 14 | 65 | 185 | 305 |
| 15 | 70 | 190 | 310 |
| 16 | 75 | 195 | 315 |
| 17 | 80 | 200 | 320 |
| 18 | 85 | 205 | 325 |
| 19 | 90 | 210 | 330 |
| 20 | 95 | 215 | 335 |
| 21 | 100 | 220 | 340 |
| 22 | 105 | 225 | 345 |
| 23 | 110 | 230 | 350 |
| 24 | 115 | 235 | 355 |

Figure 7B

| # | RAAN Drift |
|---|---|
| 1 | -35 |
| 2 | -34 |
| 3 | -33 |
| 4 | -32 |
| 5 | -31 |
| 6 | -30 |
| 7 | -29 |
| 8 | -28 |
| 9 | -27 |
| 10 | -26 |
| 11 | -25 |
| 12 | -24 |
| 13 | -23 |
| 14 | -22 |
| 15 | -21 |
| 16 | -20 |
| 17 | -19 |
| 18 | -18 |
| 19 | -17 |
| 20 | -16 |
| 21 | -15 |

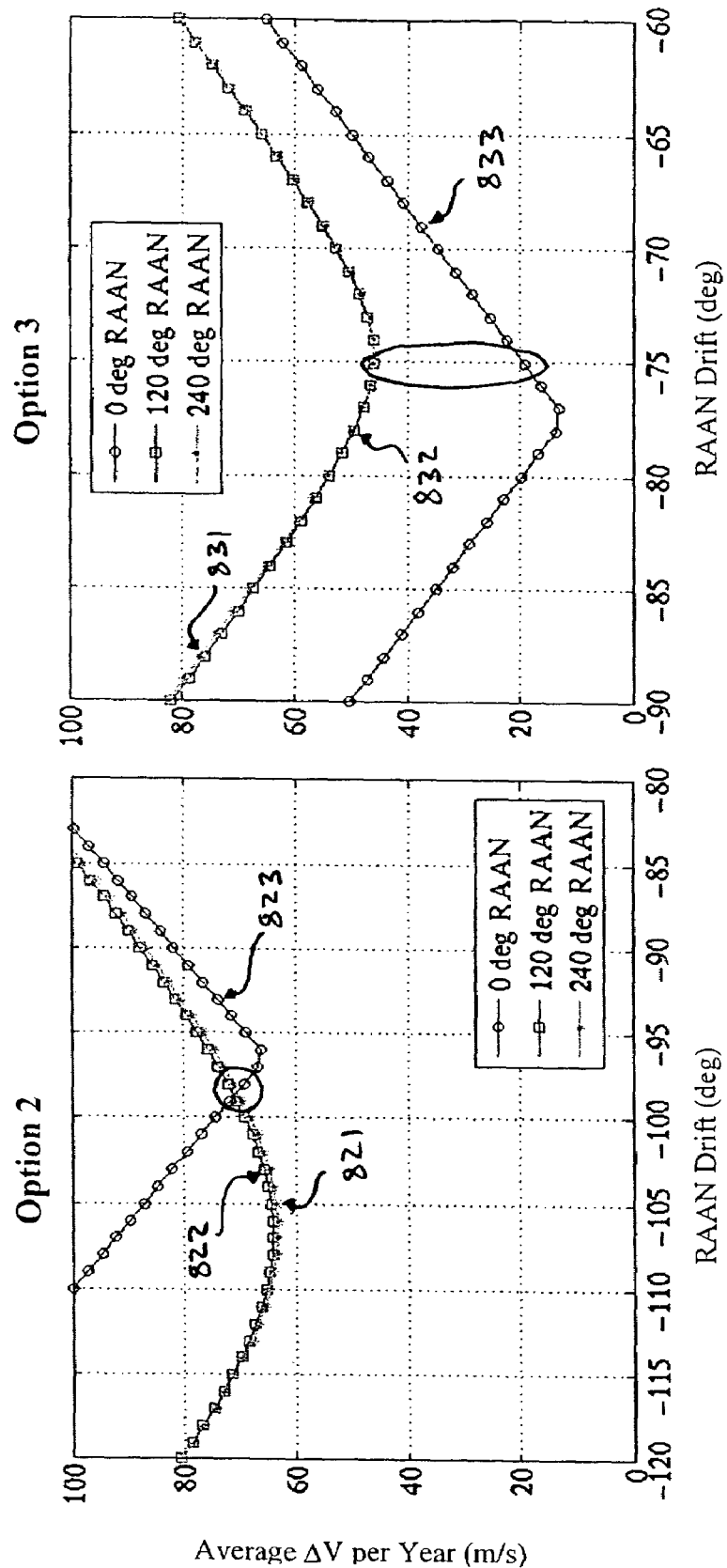

STATIONKEEPING OPTIMIZATION FOR INCLINED ELLIPTICAL SATELLITE ORBIT CONSTELLATIONS

CROSS-REFERENCE TO RELATED APPLICATION

The present application claims the benefit of priority under 35 U.S.C. §119 from U.S. Provisional Patent Application Ser. No. 60/686,286 entitled "STATIONKEEPING OPTIMIZATION FOR INCLINED ELLIPTICAL SATELLITE MOBILE BROADCAST ORBIT CONSTELLATIONS," filed on Jun. 1, 2005, the disclosure of which is hereby incorporated by reference in its entirety for all purposes.

STATEMENT REGARDING FEDERALLY SPONSORED RESEARCH OR DEVELOPMENT

Not Applicable.

FIELD OF THE INVENTION

The present invention generally relates to satellite constellations and, more particularly, relates to satellite constellations with optimized stationkeeping fuel consumption.

BACKGROUND OF THE INVENTION

Constellations of satellites having inclined, elliptical orbits are useful for providing communication coverage to Earth. One approach to providing continuous coverage uses two or more satellites having the same ground track. To ensure that the satellites have the same ground track, a fixed angular separation is maintained between the ascending node of each orbit (the intersection of the orbit with the equatorial plane of Earth where the satellite crosses from the southern hemisphere into the northern hemisphere). The ascending nodes of the orbits may be equally or unequally spaced, depending upon the mission requirements. Because each satellite orbit therefore has a different position with respect to the Earth, the sun and the moon, gravitational effects of these bodies perturb the orbit of each satellite to a differing degree, causing each orbit to tend to precess around the Earth at a different rate. This precession is measured as a drift rate in the right ascension of the ascending node ("RAAN") of each orbit. These perturbations also affect the other orbital elements, such as the argument of perigee, the semi-major axis, the eccentricity, the argument of perigee and the inclination.

Because the RAAN drift rate for each orbit in a constellation is prone to varying at a different rate, the orbits, if left uncorrected, would tend to lose their fixed angular separation. Accordingly, stationkeeping fuel stored onboard each satellite must be expended in controlled engine burns to maintain a single RAAN drift rate for all of the orbits, as well as to maintain the other orbital elements of the satellite orbits. If the effects of these orbital perturbations could be minimized for the constellation, the satellites would require less stationkeeping fuel onboard, permitting a greater payload mass for a given launch vehicle.

Accordingly, there is a need to optimize inclined, elliptical satellite constellations with a shared ground track to experience less orbital perturbations and to require less stationkeeping fuel. The present invention satisfies these needs and provides other advantages as well.

SUMMARY OF THE INVENTION

In accordance with the present invention, a satellite constellation having a plurality of orbits with a common ground track is optimized for minimal stationkeeping fuel consumption by selecting an optimal combination of initial right ascension of ascending node ("RAAN") values for each satellite orbit and a RAAN drift rate for the constellation that result in a minimal fuel consumption value for the highest fuel-consuming satellite in the constellation to correct for orbital perturbations over the life of the constellation mission. The combination may be selected by iteratively calculating the fuel consumption costs for each satellite in the constellation over the life of the constellation mission for every combination of initial RAAN values and RAAN drift rates. The highest fuel-consuming satellite from each combination is compared with the highest fuel-consuming satellites from every other combination, and a combination with the lowest fuel consumption for its highest fuel-consuming satellite is chosen.

According to one embodiment, the present invention is a satellite constellation including a plurality of satellites, each satellite having a corresponding orbit. Each orbit is an inclined elliptical orbit having an initial right ascension of ascending node ("RAAN") value, a RAAN drift rate, a semi-major axis, an eccentricity, an argument of perigee and an inclination. The RAAN drift rate for each of the orbits is equal. One of the satellites has a highest fuel consumption value in relation to the other satellites in the plurality of satellites. Each satellite has a fuel consumption value required to maintain the RAAN drift rate, the semi-major axis, the eccentricity, the argument of perigee and the inclination of the corresponding orbit. The initial RAAN value and the RAAN drift rate for each orbit correspond to a minimized fuel consumption value for the satellite having the highest fuel consumption value.

According to another embodiment, the present invention is a satellite constellation including a plurality of satellites, each satellite having a corresponding orbit with an initial right ascension of ascending node ("RAAN") value and a RAAN drift rate. The initial RAAN value and the RAAN drift rate for each orbit are selected by generating a plurality of initial ascending node data sets. Each initial RAAN value within each initial ascending node data set is separated from adjacent RAAN values by at least one predetermined separation angle. The initial RAAN values within each initial ascending node data set are separated from the initial RAAN values within an adjacent initial ascending node data set by a first step size. The initial RAAN value and the RAAN drift rate for each orbit are further selected by generating a plurality of RAAN drift rates, each RAAN drift rate being separated from an adjacent RAAN drift rate by a second step size. The initial RAAN value and the RAAN drift rate for each orbit are further selected by calculating, for each possible data combination that includes one of the plurality of initial ascending node data sets and one of the plurality of RAAN drift rates, a fuel consumption value for each satellite in the constellation corresponding to the amount of fuel required to correct for orbital perturbations and to maintain the at least one predetermined separation angle between orbits during a predetermined mission time period. The fuel consumption value for each satellite in the constellation is stored in a fuel consumption data set corresponding to the respective data combination. The initial RAAN value and the RAAN drift rate for each orbit are further selected by determining, for each fuel consumption data set corresponding to each respective data combination, a maximum fuel consumption value from the plurality of fuel consumption values in the fuel consumption data set. The initial RAAN value and the RAAN drift rate for each orbit are further selected by selecting, from the maximum fuel consumption values determined for all data combinations, the data combination corresponding to a lowest maximum fuel consumption value in comparison to all other maximum fuel consumption values.

According to another embodiment, the present invention is a method for optimizing stationkeeping fuel consumption of a satellite constellation having a plurality of satellites, where each satellite has a corresponding orbit. The method includes a first generating step of generating a plurality of initial ascending node data sets. Each initial ascending node data set includes an initial right ascension of ascending node ("RAAN") value for each orbit in the constellation. Each initial RAAN value within each initial ascending node data set is separated from adjacent RAAN values by at least one predetermined separation angle. The initial RAAN values within each initial ascending node data set are separated from the initial RAAN values within an adjacent initial ascending node data set by a first step size. The method further includes a second generating step of generating a plurality of RAAN drift rates. Each RAAN drift rate is separated from an adjacent RAAN drift rate by a second step size. The method further includes a calculating step of calculating, for each possible data combination that includes one of the plurality of initial ascending node data sets and one of the plurality of RAAN drift rates, a fuel consumption value for each satellite in the constellation corresponding to the amount of fuel required to correct for orbital perturbations and to maintain the at least one predetermined separation angle between the orbits during a predetermined mission time period. The fuel consumption value for each satellite in the constellation is stored in a fuel consumption data set corresponding to the respective data combination. The method further includes a determining step of determining, for each fuel consumption data set corresponding to each respective data combination, a maximum fuel consumption value from the plurality of fuel consumption values in the fuel consumption data set. The method further includes a selecting step of selecting, from the maximum fuel consumption values determined for all data combinations, the data combination corresponding to a lowest maximum fuel consumption value in comparison to all other maximum fuel consumption values.

According to another embodiment, computer-executable process steps of the present invention are for optimizing stationkeeping fuel consumption of a satellite constellation having a plurality of satellites, where each satellite has a corresponding orbit. The process steps include generating a plurality of initial ascending node data sets, each initial ascending node data set including an initial right ascension of ascending node ("RAAN") value for each orbit in the constellation. Each initial RAAN value within each initial ascending node data set is separated from adjacent RAAN values by at least one predetermined separation angle. The initial RAAN values within each initial ascending node data set are separated from the initial RAAN values within an adjacent initial ascending node data set by a first step size. The process steps further include generating a plurality of RAAN drift rates, each RAAN drift rate being separated from an adjacent RAAN drift rate by a second step size. The process steps further include calculating, for each possible data combination that includes one of the plurality of initial ascending node data sets and one of the plurality of RAAN drift rates, a fuel consumption value for each satellite in the constellation corresponding to the amount of fuel required to correct for orbital perturbations and to maintain the at least one predetermined separation angle between orbits during a predetermined mission time period. The fuel consumption value for each satellite in the constellation is stored in a fuel consumption data set corresponding to the respective data combination. The process steps further include determining, for each fuel consumption data set corresponding to each respective data combination, a maximum fuel consumption value from the plurality of fuel consumption values in the fuel consumption data set. The process steps further include selecting, from the maximum fuel consumption values determined for all data combinations, the data combination corresponding to a lowest maximum fuel consumption value in comparison to all other maximum fuel consumption values.

According to another embodiment, the present invention is a computer-readable medium carrying one or more sequences of instruction for optimizing stationkeeping fuel consumption of a satellite constellation having a plurality of satellites, each satellite having a corresponding orbit, wherein the execution of the one or more sequences of instructions by one or more processors causes the one or more processors to perform the step of generating a plurality of initial ascending node data sets, each initial ascending node data set including an initial right ascension of ascending node ("RAAN") value for each orbit in the constellation. Each initial RAAN value within each initial ascending node data set is separated from adjacent RAAN values by at least one predetermined separation angle. The initial RAAN values within each initial ascending node data set are separated from the initial RAAN values within an adjacent initial ascending node data set by a first step size. The execution of the one or more sequences of instructions by one or more processors causes the one or more processors to further perform the step of generating a plurality of RAAN drift rates, each RAAN drift rate being separated from an adjacent RAAN drift rate by a second step size. The execution of the one or more sequences of instructions by one or more processors causes the one or more processors to further perform the step of calculating, for each possible data combination that includes one of the plurality of initial ascending node data sets and one of the plurality of RAAN drift rates, a fuel consumption value for each satellite in the constellation corresponding to the amount of fuel required to correct for orbital perturbations and to maintain the at least one predetermined separation angle between orbits during a predetermined mission time period. The fuel consumption value for each satellite in the constellation is stored in a fuel consumption data set corresponding to the respective data combination. The execution of the one or more sequences of instructions by one or more processors causes the one or more processors to further perform the step of determining, for each fuel consumption data set corresponding to each respective data combination, a maximum fuel consumption value from the plurality of fuel consumption values in the fuel consumption data set. The execution of the one or more sequences of instructions by one or more processors causes the one or more processors to further perform the step of selecting, from the maximum fuel consumption values determined for all data combinations, the data combination corresponding to a lowest maximum fuel consumption value in comparison to all other maximum fuel consumption values.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 7A is a chart illustrating a number of right ascension of ascending node data sets generated according to a process of the present invention;

FIG. 7B is a chart illustrating a number of right ascension of ascending node drift rates generated according to a process of the present invention;

FIGS. 8A-8D are graphs depicting experimental results of a method for optimizing stationkeeping fuel consumption of a number of satellite constellations according to several embodiments of the present invention.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
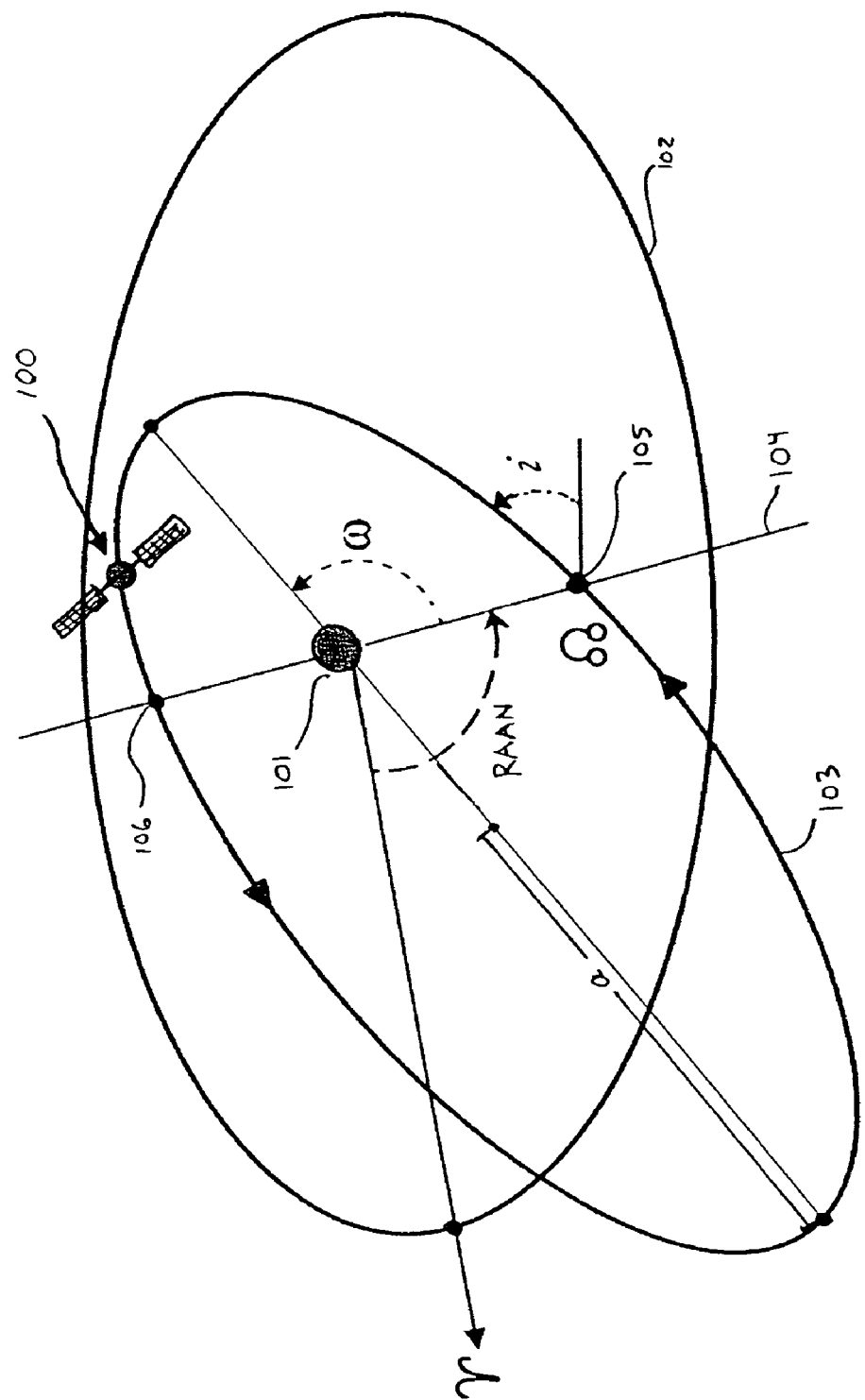
FIG. 1 depicts a highly inclined elliptical orbit according to one aspect of the present invention.

A highly elliptical orbit ("HEO") is illustrated in FIG. 1. The orbit 103 of satellite 100 is inclined at angle of inclination i above the equatorial plane 102 of Earth 101. The intersection of orbit 103 and equatorial plane 102 defines the line of nodes 104, which connects the ascending node 105 and the descending node 106 of orbit 103. Orbit 103 is further uniquely specified by its argument of perigee $\omega$, its semi-major axis $\alpha$, its eccentricity e and the right ascension of its ascending node ("RAAN"), measured from the vernal equinox $\gamma$. If orbit 103 precesses around the Earth, the RAAN of orbit 103 varies with time by a drift rate.

To maintain a highly elliptical orbit, three types of maneuvers may be necessary to correct for orbital perturbations caused by the gravitational effect of the moon, the sun and the Earth. Large in-plane maneuvers are used to control the eccentricity e and the argument of perigee $\omega$ of an orbit. Small in-plane maneuvers are used to control the semi-major axis a to correct for perturbation due to Earth's gravitational tesseral resonance effects. Large out-of-plane maneuvers are used to control the inclination i and RAAN of the orbit. These large out-of-plane maneuvers are also used to control the drift rate of the RAAN of an orbit.

The orbital perturbations experienced by a satellite are dependent upon its relative location to the Earth, moon and sun. In particular, the orbital perturbations are dependent upon the RAAN of an orbit. Accordingly, for a given initial RAAN value and a known RAAN drift rate, it is possible to calculate the total orbital perturbations experienced by a satellite over an extended period of time, such as the lifespan of a constellation mission. By varying the initial RAAN value and the desired RAAN drift rate used to calculate these orbital perturbations until a minimum result is determined, it is possible to configure the orbit of a satellite to require minimal fuel for the stationkeeping maneuvers necessary to correct for orbital perturbations and to maintain its desired RAAN drift rate.

Figure 2:
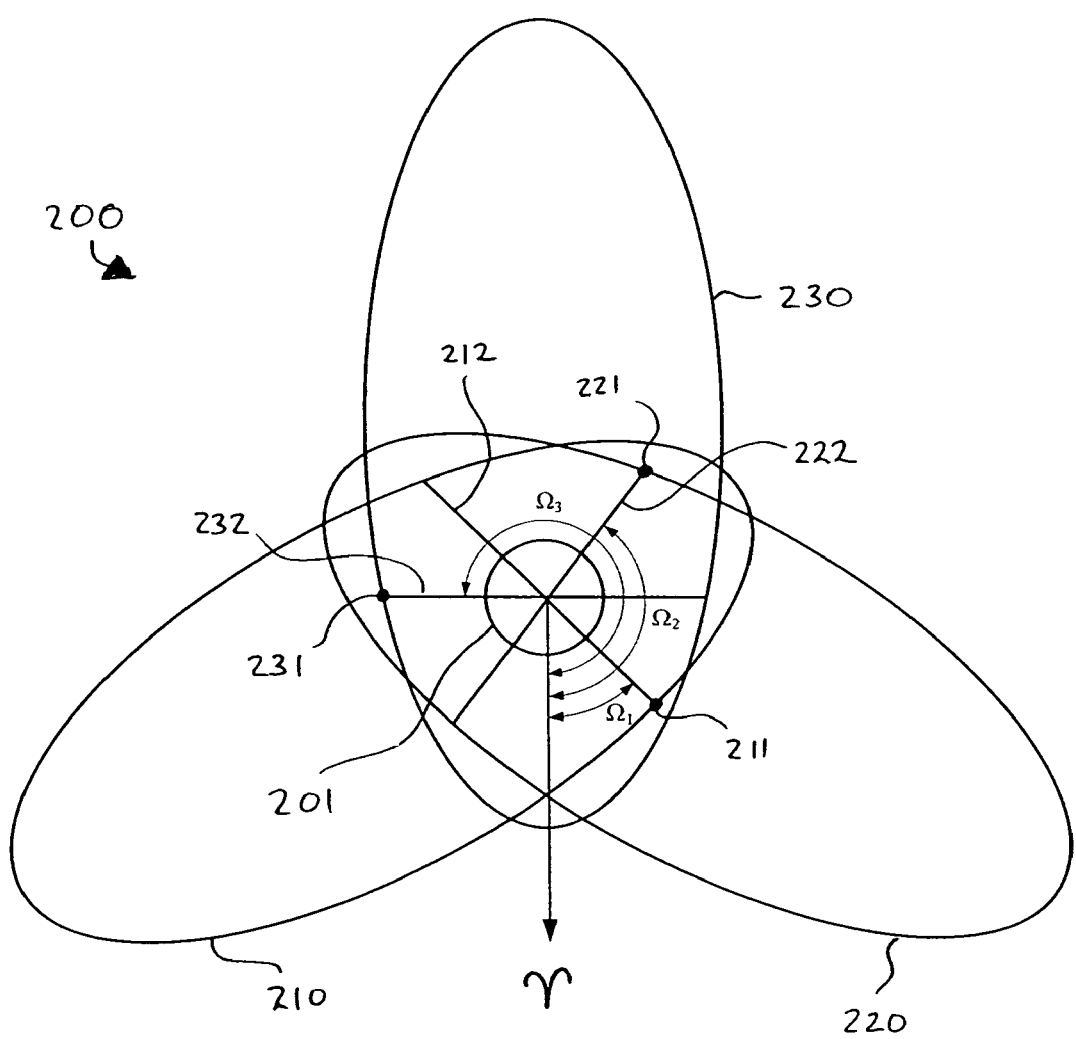
FIG. 2 depicts a constellation of highly inclined elliptical orbits according to another aspect of the present invention.

In a similar fashion, the orbital perturbations experienced by a constellation consisting of more than one satellite can be calculated for a combination of initial RAAN values and RAAN drift rates. Such a constellation is illustrated in FIG. 2. Constellation 200 includes three satellites in three separate orbits 210, 220 and 230. These orbits are all inclined with respect to the equatorial plane, and intersect the equatorial plane through their respective lines of node 212, 222 and 232. The ascending nodes 211, 221 and 231 of each orbit each have a right ascension $\Omega_i$, $\Omega_2$ and $\Omega_3$ measured from the vernal equinox $\gamma$.

To ensure that the ascending nodes of the orbits maintain their fixed spacing, the RAAN drift rate for each orbit 210, 220 and 230 must be equal. Because the orbital perturbations experienced by each satellite are dependent upon the RAAN of its orbit, however, each of the orbits 210, 220 and 230 will experience different orbital perturbations that tend to cause their RAAN drift rates to diverge, unless corrected by stationkeeping maneuvers. To optimize the stationkeeping fuel consumption of the constellation, the present invention provides a method for calculating the orbital perturbations for each satellite in the constellation for a variety of combinations of initial RAAN values and RAAN drift rates to determine the combination corresponding to the minimal orbital perturbations experienced by the constellation.

Figure 3:
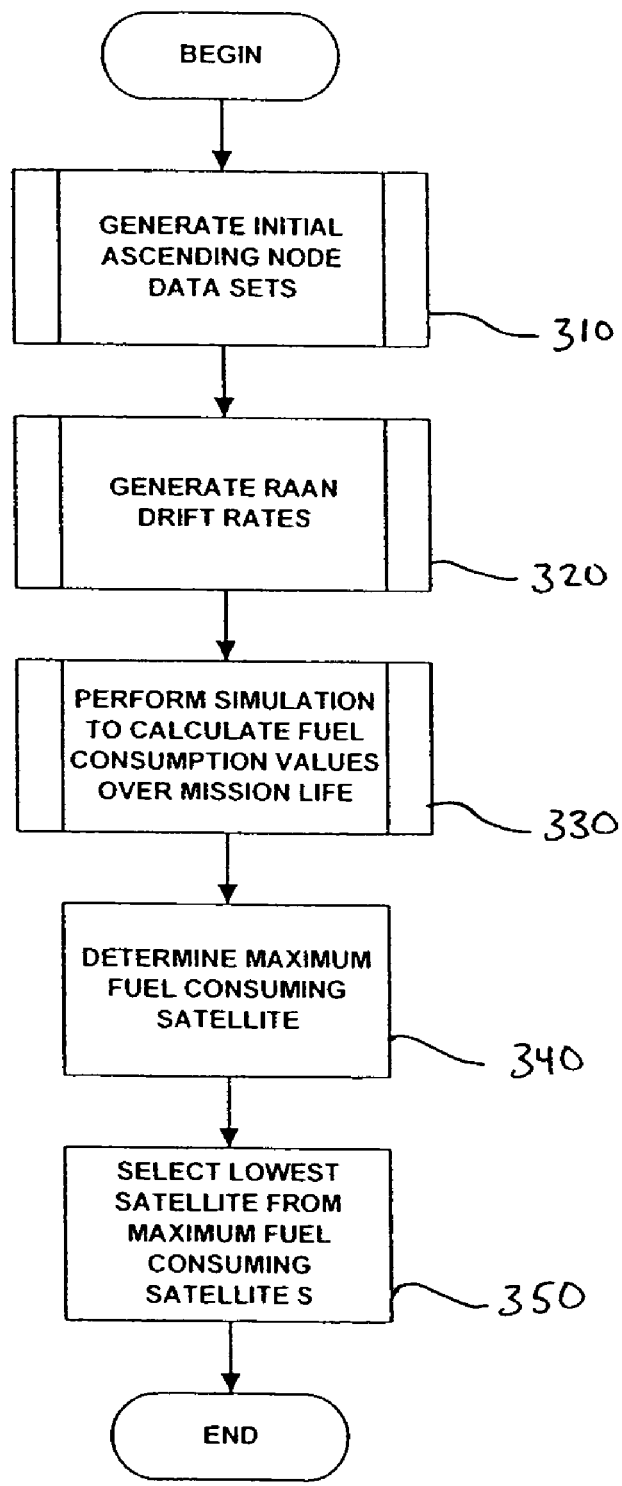
FIG. 3 is a flowchart illustrating a method for optimizing stationkeeping fuel consumption of a satellite constellation according to one embodiment of the present invention.

FIG. 3 is a flowchart illustrating a method for optimizing stationkeeping fuel consumption of a satellite constellation having a plurality of satellites according to one embodiment of the present invention. In step 310 of the process, a number of initial ascending node data sets are generated, as will be illustrated in greater detail below, with reference to FIG. 4. Each initial ascending node data set contains an initial RAAN value for each satellite in a constellation. In step 320, a number of RAAN drift rates are generated, as will be illustrated in greater detail below with reference to FIG. 5. In step 330, a simulation is performed to calculate orbital perturbations and fuel consumption values for every satellite in the constellation for each combination of one initial ascending node data set and one RAAN drift rate, as is illustrated in greater detail below with reference to FIG. 6.

The process continues in step 340, in which a maximum fuel consumption value corresponding to a maximum fuel consuming satellite for each combination of an ascending node data set and a RAAN drift rate is determined. If a combination yielded more than one satellite with a maximum fuel consumption value, any of the maximum fuel consuming satellites from that combination may be selected. From the fuel consumption values corresponding to satellites determined to be maximum fuel consuming satellites in step 340, a lowest fuel consumption value is determined in step 350.

The data combination corresponding to this lowest fuel consumption value is selected as the data combination corresponding to an optimized satellite constellation, and the process ends.

According to one embodiment, the fuel consumption values corresponding to the data combination selected are sufficiently low to allow the satellites in the constellation to correct for orbital perturbations and to maintain the RAAN drift rate of that data combination for the predetermined mission time period. For example, according to one embodiment in which the predetermined mission time period is 15 years, the fuel consumed by the satellites over the 15 year period to correct for orbital perturbations, including those that affect the RAAN drift rate of each satellite, is an amount less than or equal to the amount of fuel the satellites have onboard. In addition, the fuel consumption values corresponding to the data combination selected are sufficiently low to allow the satellites in the constellation to maintain other orbital parameter of their corresponding orbits, such as, for example, the semi-major axis, the eccentricity, the argument of perigee and the inclination.

Because the method of the present invention minimizes the fuel consumption of the highest fuel-consuming satellite in the constellation, the difference in fuel consumption between the satellites is reduced, permitting a common satellite design for every satellite in the constellation. A common satellite design permits all satellites in the constellation to be launched by similar launch vehicles, reducing the total cost of a constellation mission.

Figure 4:
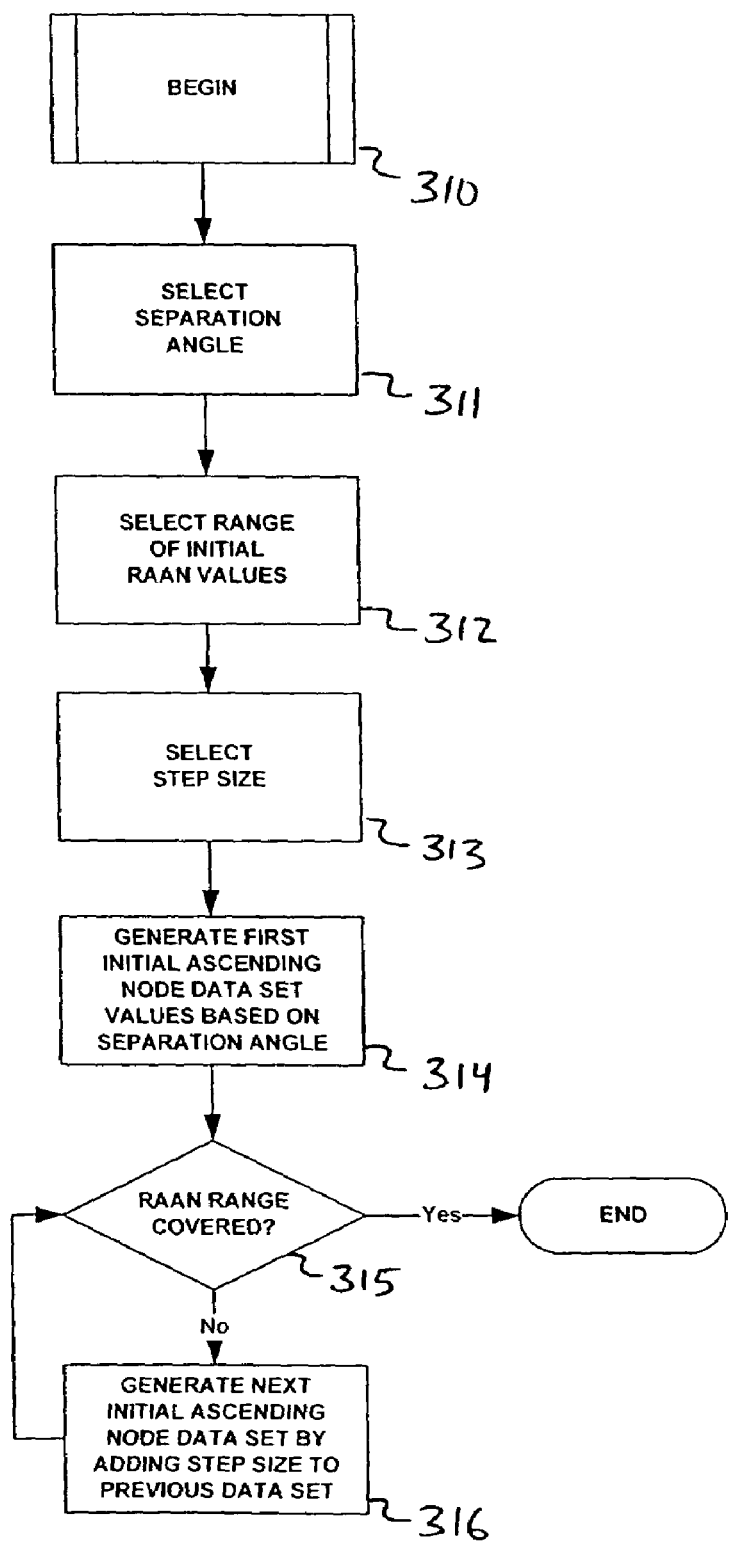
FIG. 4 is a flowchart further illustrating one step of a method for optimizing stationkeeping fuel consumption of a satellite constellation according to one embodiment of the present invention.

Turning to FIG. 4, the generation of initial ascending node data sets of step 310 is illustrated in greater detail. The initial ascending node data sets each include an initial RAAN value for each satellite orbit in the constellation. Within each initial ascending node data set, the initial RAAN value of the orbits in the constellation are separated from each other by a predetermined separation angle, which is determined in step 311. For example, in an embodiment in which a constellation has orbits with equally spaced ascending nodes, the separation angle is calculated in step 311 by dividing 360° by the number of orbits in the constellation. According to one embodiment of the present invention in which a constellation having three equally spaced satellite orbits is optimized, the separation angle is 120°.

While the present invention has been illustrated with respect to an exemplary embodiment having a constellation with equally spaced satellite orbits, the scope of the present invention is not limited to such an arrangement. Rather, the present invention has application to numerous other embodiments with different orbital arrangements, including arrangements with satellite orbits that are not equally spaced, as will be apparent to one of skill in the art. For example, in an embodiment of the present invention in which a constellation having three unequally spaced satellite orbits is optimized, there may be multiple separation angles, such as, for example, 60°, 120° and 180°.

In step 312, a range of initial RAAN values is selected. For example, in one embodiment, launch window considerations may limit the available initial RAAN values to a range of less than a full 360°. Accordingly, to increase the efficiency of the process, those initial RAAN values which it is impracticable to use can be omitted from further calculation. In yet other embodiments, however, in which launch window limitations are not a factor, or in which computational resources are not a limitation, the range chosen may be 0° to 360°.

The initial RAAN values for each adjacent ascending node data set are separated by a step size, which is determined in step 313. The step size is chosen to determine the accuracy of the optimization process. A smaller step size provides higher accuracy at the cost of more intensive processing. According to one embodiment of the present invention in which a satellite constellation having three equally spaced orbits is optimized, a step size of 5° may be used to separate adjacent ascending node data sets in order to provide a good balance of accuracy and processing time. As will be apparent to one of skill in the art, other step sizes may be used for greater or lower accuracy within the scope of the present invention.

Turning to step 314, values for a first initial ascending node data set are generated. According to one embodiment, the first value in this data set is chosen to be 0° for the sake of convenience. Any angular value within the range selected in step 312 may be chosen, however, within the scope of the present invention. This first value corresponds to an initial RAAN value for the orbit of the first satellite in the first ascending node data set. The value for the next satellite orbit in the data set is generated by adding the separation angle selected in step 311 to the first value. For example, in the exemplary embodiment in which a satellite constellation having three equally spaced orbits is optimized, if the value for the first satellite orbit is chosen to be 0°, the value for the next satellite orbit in the same ascending node data set will be 120°. This second value corresponds to an initial RAAN value for the second satellite orbit in the first ascending node data set. In this manner, initial RAAN values for each satellite orbit in the first ascending node data set are generated. In the present exemplary embodiment, for example, values of 0°, 120° and 240° are generated for the first initial ascending node data set.

In step 315, the process determines whether the range of initial RAAN values selected in step 312 has been covered. In the present exemplary embodiment, the range of initial RAAN values is selected to be from 0° to 360°, so the range has not yet been covered. Accordingly, the process proceeds to step 316, in which values for the next initial ascending node data set are generated by adding the step size selected in step 313 to the values of the previous initial ascending node data set. Accordingly, in the present exemplary embodiment, the step size of 5° is added to the values in the previous initial ascending node data set to generate values for the current initial ascending node data set of 5°, 125° and 245°. The process then returns to step 315.

This generation of initial ascending node data sets continues until the range of initial RAAN values selected in step 312 has been covered. For example, in the present exemplary embodiment, once the range of 0° to 360° has been covered in 5° increments (corresponding to the step size selected in step 313), the range has been covered, and the process ends. For an embodiment having equally spaced satellite orbits, the number of generated initial ascending node data sets can be determined by dividing the separation angle determined in step 311 by the step size determined in step 313. For example, in the embodiment discussed above having three equally spaced orbits and a step size of 5°, the number of ascending node data sets is 24 (120°/5°.

Figure 5:
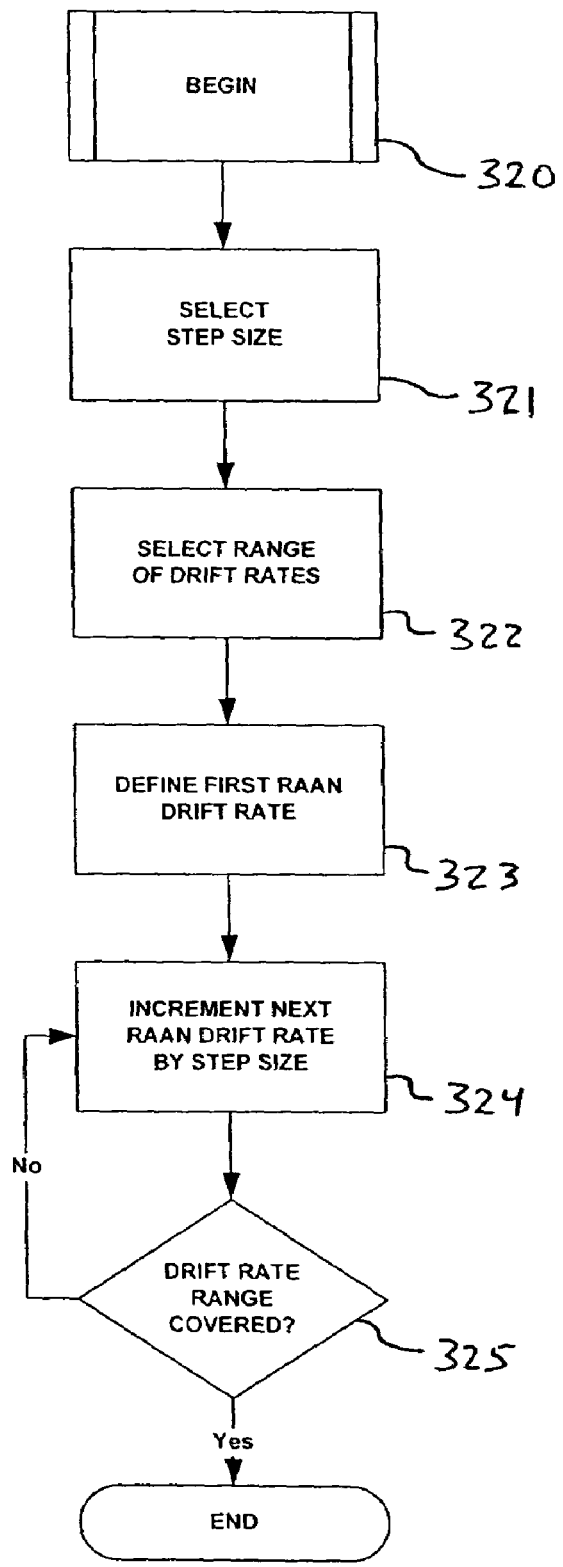
FIG. 5 is a flowchart further illustrating one step of a method for optimizing stationkeeping fuel consumption of a satellite constellation according to one embodiment of the present invention.

Turning to FIG. 5, the generation of a number of RAAN drift rates is illustrated in greater detail. In step 321, a step size for separating adjacent RAAN drift rate values is selected. Much like the step size selected for separating adjacent initial ascending node data sets, the step size for separating adjacent RAAN drift rate values is selected to balance the benefit of higher accuracy with the detriment of processing intensity. According to one embodiment of the present invention in which a satellite constellation having three equally spaced orbits is optimized, a step size of 1° per year may be used to separate adjacent RAAN drift rate values in order to provide a good balance of accuracy and processing time. As will be apparent to one of skill in the art, other step sizes may be used for greater or lower accuracy within the scope of the present invention.

Using prior knowledge about the direction of the orbits of the satellites, a direction and approximate rate of natural precession of the orbits can be predicted. Accordingly, a range of RAAN drift rates surrounding these predicted values is selected in step 322 to ensure that the optimal value for all the orbits is included. The number of RAAN drift rates within the range is determined by the size of the desired range and the step size determined in step 321. For example, according to one exemplary embodiment in which the satellites orbit with prograde motion, the natural precession of these orbits will tend to be retrograde. If the predicted values for the retrograde drift of three orbits are −20°, −30° and −40° per year, a range of RAAN drift rates larger than the span included in these three values is selected to ensure that the common optimal RAAN drift rate is included in the calculation.

Accordingly, in step 323, a first RAAN drift rate is defined. According to the present exemplary embodiment of three satellites with predicted retrograde precession of −30°, −25° and −20° per year, the first RAAN drift rate is defined to be −35°. In step 324, the next RAAN drift rate is defined by incrementing the previous RAAN drift rate by the step size determined in step 321. Step 325 repeats the incrementing of step 324 for each remaining RAAN drift rate within the range selected in step 322.

Figure 6:
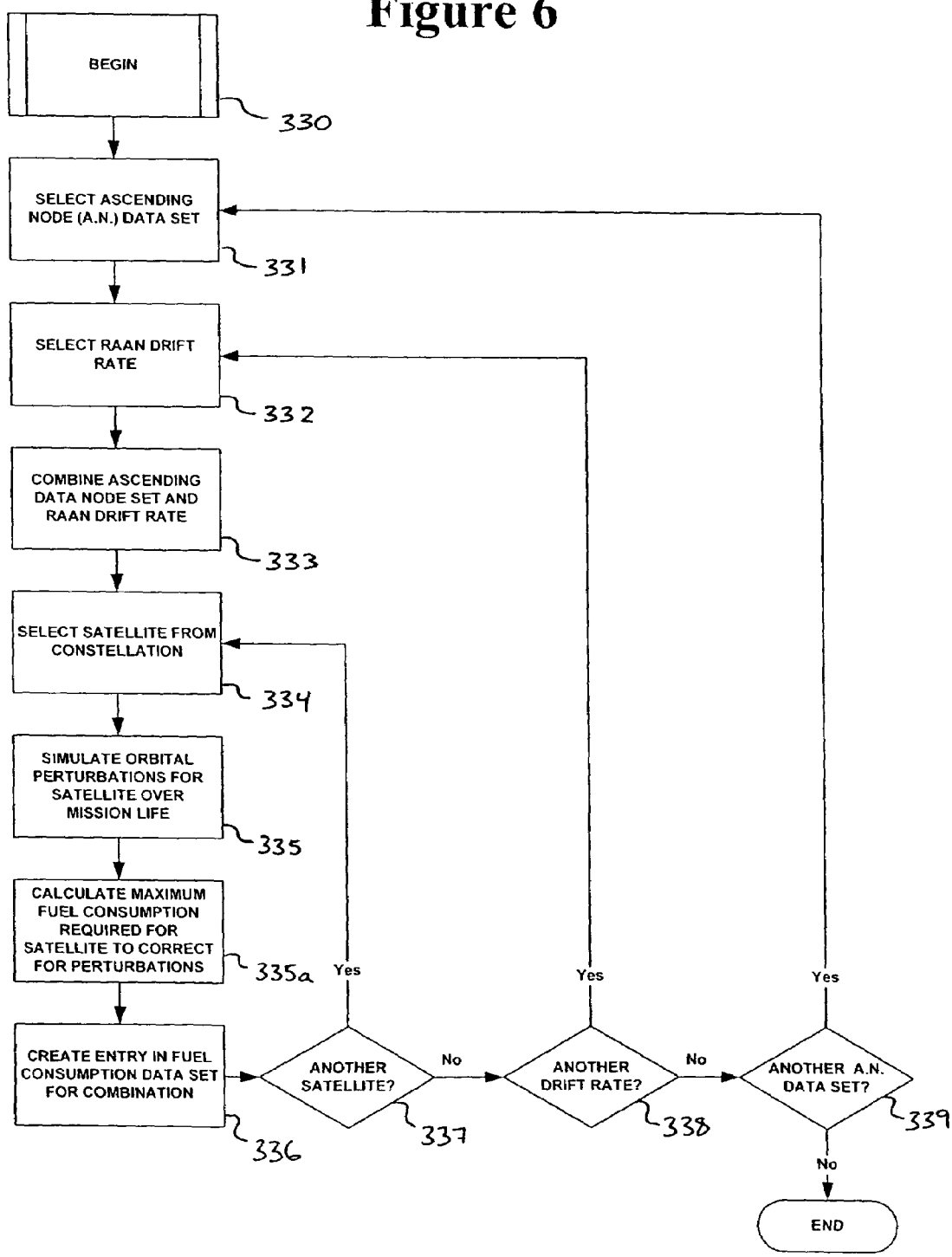
FIG. 6 is a flowchart further illustrating one step of a method for optimizing stationkeeping fuel consumption of a satellite constellation according to one embodiment of the present invention.

Turning to FIG. 6, the performance of the simulation of step 330 is illustrated in greater detail. The simulation calculates orbital perturbations and fuel consumption values for every satellite in the constellation for each combination of one initial ascending node data set and one RAAN drift rate. The simulation process begins with step 331, in which one of the initial ascending node data sets generated in step 310 is selected. In step 332, one of the RAAN drift rates generated in step 320 is selected. In step 333, these parameters are combined to give a combination of RAAN parameters of the constellation to be simulated. In step 334, the first satellite of the constellation corresponding to the first initial RAAN value in the initial ascending node data set is selected. The orbital perturbations experienced by this satellite, given the initial RAAN value and RAAN drift rate of its orbit, are simulated for the duration of the constellation mission life in step 335.

Using the orbital perturbations simulated in step 335, the process calculates the maneuvers necessary to control the orbit of the satellite selected in step 334. The orbital perturbations simulated in step 335 may require large in-plane maneuvers to control the eccentricity e and the argument of perigee ω of the orbit. The orbital perturbations may further require small in-plane maneuvers to control the semi-major axis a of the orbit and large out-of-plane maneuvers to control the inclination i and RAAN drift rate of the orbit. The change in velocity ("ΔV") necessary to effect these maneuvers is calculated. The scope of the present invention includes simulations in which maneuvers necessary to control additional orbital elements are calculated, as well as simulations in which orbital maneuvers necessary to control fewer orbital elements than are listed here are calculated.

The stationkeeping fuel requirements associated with each of these maneuvers are calculated and totaled in step 335a. The total fuel consumption necessary to correct for orbital perturbations of the satellite currently under consideration, given the combination of the initial RAAN value and RAAN drift rate of its orbit, is entered in a fuel consumption data set in step 336. The process then performs an equivalent simulation for each remaining satellite in the constellation using the same combination of an ascending node data set and RAAN drift rate as is illustrated by step 337. The simulation of each subsequent satellite differs from the previous in that the initial RAAN value for the orbit of the subsequent satellite is incremented from the initial RAAN value of the orbit of the previous satellite by the separation angle selected in step 311.

Once every satellite in the constellation has been simulated for a given combination of an ascending node data set and an RAAN drift rate, the process proceeds to the next RAAN drift rate generated in step 320, as is illustrated in step 338. For this new combination, the simulation is repeated for each satellite in the constellation and corresponding entries are recorded in the fuel consumption data set. Once the first ascending node data set has been combined with every RAAN drift rate generated in step 320 and corresponding simulations have been performed, the next ascending node data set is selected, and the process repeats, as is illustrated in step 339. In this way, simulations are run for each satellite for every combination of ascending node data sets and RAAN drift rates, and corresponding entries are recorded in the fuel consumption data set.

Turning to FIG. 7A, a chart illustrating ascending node data sets generated in step 310 is depicted according to one embodiment of the present invention. In this exemplary embodiment, the constellation includes three orbits i, j and k. Each ascending node data set includes initial RAAN values for each of the orbits. Each ascending node data set is separated from an adjacent ascending node data set by a step size. In this exemplary embodiment, the step size is 5°. Accordingly, the initial RAAN values for orbit i in data sets 1 and 2 are 0° and 5°, respectively.

Turning to FIG. 7B, a chart illustrating RAAN drift rates generated in step 320 is depicted according to one embodiment of the present invention. In this exemplary embodiment, twenty one RAAN drift rates have been generated, varying from −35° to −15° per year in 1° steps. As will be apparent to one of skill in the art, however, the scope of the present invention is not limited to this range of RAAN drift rates or this step size. Rather, any range of RAAN drift rates may be generated, separated by any step size, within the scope of the present invention.

Table 1 illustrates experimental data for several exemplary embodiments of the present invention, in which the minimal change in velocity necessary to correct for orbital perturbations of four different constellations of three satellites each has been calculated according to the method of the present invention. From this ΔV, it is a simple matter to calculate the stationkeeping fuel required by a given satellite mass, as will be apparent to one of skill in the art.

TABLE 1

| | RAAN Drift | Average ΔV per Year (m/s) | | | |
| --- | --- | --- | --- | --- | --- |
| | (deg/15 years) | e/ω ΔV | i/RAAN ΔV | a ΔV | Total ΔV |
| Baseline | −54 | 40.5 | 8.9 | 0.8 | 50.2 |
| Option 1 | −79 | 16.1 | 20.0 | 0.8 | 36.9 |
| Option 2 | −99 | 65.2 | 6.6 | 0.8 | 72.6 |
| Option 3 | −75 | 33.7 | 12.3 | 0.8 | 46.8 |

The baseline option is a constellation which provides extensive coverage to the continental United States ("CONUS"). The constellation includes three satellites in HEO orbits with an inclination i of about 63.4°, a semi-major axis a of about 42,000 km and an eccentricity of about 0.268. The constellation has a mission life of about 15 years. Based upon these parameters, the optimal RAAN drift rate was calculated to be −54° over 15 years, and the optimal initial RAAN values were calculated to be 0°, 120° and 240° (as discussed with reference to FIG. 8A, below). The total ΔV per year for the baseline option optimized constellation is 50.2 m/s (the sum of 40.5 m/s for large in-plane maneuvers to control the eccentricity e and the argument of perigee ω of each orbit, 8.9 m/s for large out-of-plane maneuvers to control the inclination i and RAAN of each orbit, and 0.8 m/s for small in-plane maneuvers to control the semi-major axis a of each orbit). This ΔV compares very well against prior art approaches, in which the ΔV for the highest fuel consuming satellite in a similar baseline constellation was 80 m/s. The optimal solution according to the current exemplary embodiment of the present invention requires 29.8 m/s less ΔV.

Option 1 is a similar constellation in which the composite elevation angle of the three orbits has been maximized. The optimal RAAN drift rate was calculated to be −79° over 15 years, and the optimal initial RAAN values were calculated to be 0°, 120° and 240° (as discussed with reference to FIG. 8B, below). The total ΔV per year for the option 1 optimized constellation is 36.9 m/s (16.1+20.0+0.8). Option 2 is a similar constellation in which the signal availability from one satellite has been maximized. The optimal RAAN drift rate was calculated to be −99° over 15 years, and the optimal initial RAAN values were calculated to be 0°, 120° and 240° (as discussed with reference to FIG. 8C, below). The total ΔV per year for the option 2 optimized constellation is 72.6 m/s (65.2+6.6+0.8). Option 3 is a similar constellation in which the signal availability from two satellites has been maximized. The optimal RAAN drift rate was calculated to be −75° over 15 years, and the optimal initial RAAN values were calculated to be 0°, 120° and 240° (as discussed with reference to FIG. 8D, below). The total ΔV per year for the option 3 optimized constellation is 46.8 m/s (33.7+12.3+0.8).

FIGS. 8A-8D are graphs further illustrating the experimental results of the simulation run for the constellations of Table 1, in which the variation in average ΔV per year for each satellite is charted as a function of RAAN drift rate for a given initial RAAN. The optimal RAAN drift rates for these combinations of initial RAAN values, corresponding to the lowest ΔV for the highest ΔV satellites (and hence the lowest fuel consumption for the highest fuel consuming satellites) are circled.

Figures 8A, 8B:
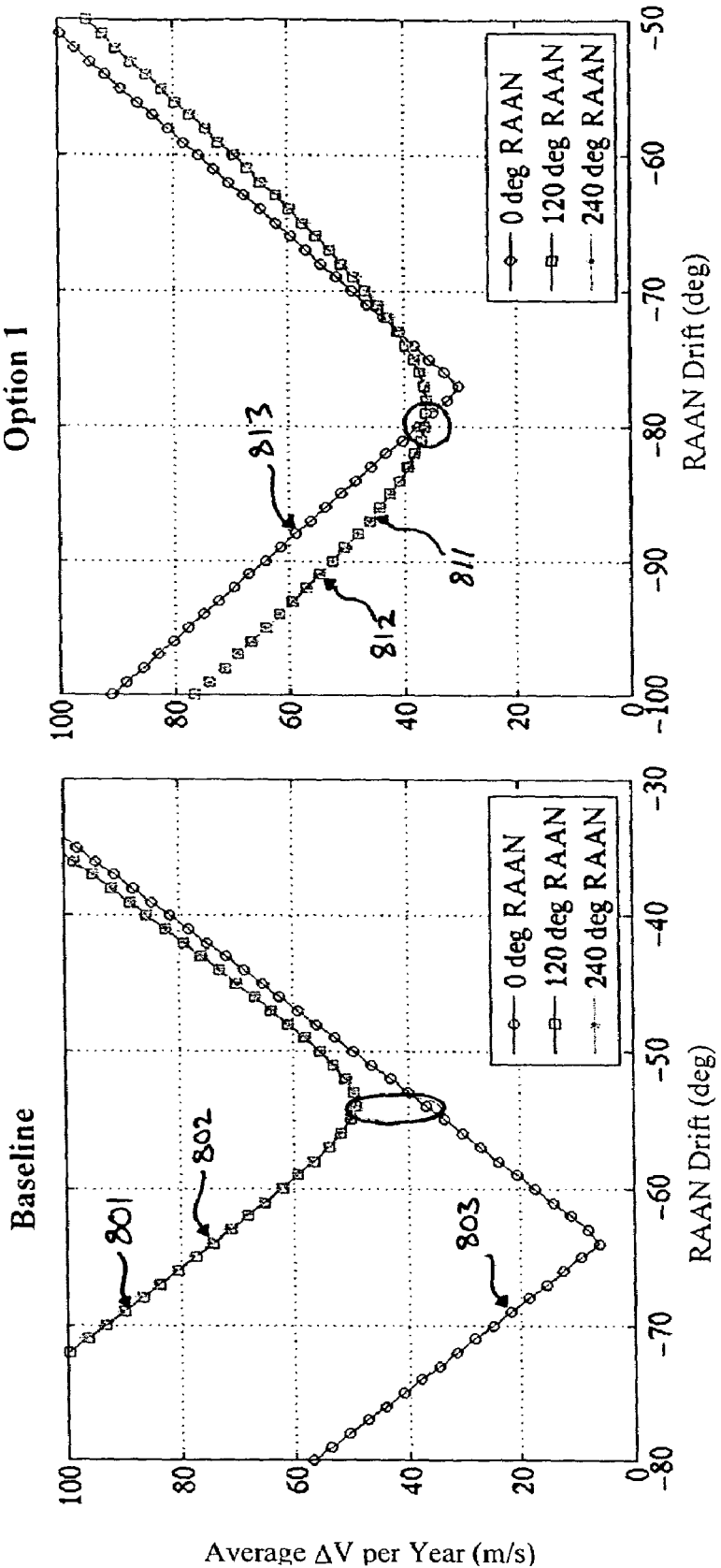

In this regard, FIG. 8A plots the average ΔV per year for each of three satellites 801, 802 and 803 in a baseline constellation for one initial ascending node data set over a variety of RAAN drift rates. In this graph, satellites 801 and 802 are both maximum fuel consuming satellites. Accordingly, the data combination corresponding to a lowest fuel consumption value for these two maximum fuel consuming satellites is circled.

FIG. 8B plots the average ΔV per year for each of three satellites 811, 812 and 813 in a constellation according to option 1 for one initial ascending node data set over a variety of RAAN drift rates. In this graph, all of satellites 811, 812 and 813 are maximum fuel consuming satellites, as is apparent from the intersection of all three plots. Accordingly, the data combination corresponding to a lowest fuel consumption value for these three maximum fuel consuming satellites is circled.

FIG. 8C plots the average ΔV per year for each of three satellites 821, 822 and 823 in a constellation according to option 2 for one initial ascending node data set over a variety of RAAN drift rates. In this graph, all of satellites 821, 822 and 823 are maximum fuel consuming satellites, as is apparent from the intersection of all three plots. Accordingly, the data combination corresponding to a lowest fuel consumption value for these three maximum fuel consuming satellites is circled.

FIG. 8D plots the average ΔV per year for each of three satellites 831, 832 and 833 in a constellation according to option 3 for one initial ascending node data set over a variety of RAAN drift rates. In this graph, satellites 831 and 832 are both maximum fuel consuming satellites. Accordingly, the data combination corresponding to a lowest fuel consumption value for these two maximum fuel consuming satellites is circled.

One benefit enjoyed by constellations optimized according to the present invention is an increase in useful payload mass that can be delivered to orbit for a given launch vehicle. For example, according to the exemplary embodiment described above, in which an optimized baseline constellation according to the current exemplary embodiment of the present invention requires 29.8 m/s less ΔV than a prior art baseline constellation, the dry mass capability of the highest fuel-consuming satellite in the constellation can be greatly increased.

According to one direct injection mission embodiment, in which a launch vehicle, such as a Proton or Atlas V 521-551, places a satellite of a constellation into its operational orbit, the method of the present invention can increase the dry mass capability of a satellite by up to 331 kg. Table 2 illustrates this advantage.

TABLE 2

|  | Maximum Dry Mass (kg) | Fuel (kg) | Wet Mass (kg) |
| --- | --- | --- | --- |
| Baseline | 3387 | 693 | 4080 |
| Option 1 | 3527 | 553 | 4080 |
| Option 2 | 3145 | 935 | 4080 |
| Option 3 | 3421 | 659 | 4080 |
| Prior Art | 3056 | 1024 | 4080 |

The analysis of the exemplary embodiments summarized in Table 2 considers satellites with standard A2100 thruster types. Monopropellant electrically augmented hydrazine arc jet thrusters with a specific impulse of about 600 seconds at 2040 W were used for the primary ΔV. Rocket engine assembly ("REA") monopropellant hydrazine thrusters with a specific impulse of about 200 seconds were used for secondary ΔV and attitude control. The analysis includes consideration of standard maneuver efficiencies based on thruster plume interference and cant angles.

Similarly, according to one transfer orbit mission embodiment, in which a satellite must maneuver from the launch vehicle orbit into its operational orbit using a series of bipropellant liquid apogee engine ("LAE") burns, the method of the present invention can increase the dry mass capability of a satellite by up to 300 kg Table 3 illustrates this advantage.

TABLE 3

|  | Vehicle | Maximum Dry Mass (kg) | Oxidizer (kg) | Fuel (kg) | Wet Mass (kg) |
| --- | --- | --- | --- | --- | --- |
| Baseline | 421 | 3017 | 940 | 1818 | 5775 |
| Option 1 | 411 | 3292 | 880 | 1480 | 5653 |
| Option 2 | 411 | 3139 | 690 | 1689 | 5518 |
| Option 3 | 411 | 3147 | 855 | 1543 | 5545 |
| Prior Art | 421 | 2717 | 825 | 1818 | 5360 |

The analysis of the exemplary embodiments summarized in Table 3 also considers satellites with standard A2100 thruster types. Monopropellant electrically augmented hydrazine arc jet thrusters with a specific impulse of about 600 seconds at 2040 W were used for the primary ΔV. REA monopropellant hydrazine thrusters with a specific impulse of about 200 seconds were used for secondary ΔV and attitude control. A LAE bipropellant 100 lbf thruster with a specific impulse of about 300 seconds is used for the transfer orbit ΔV. The analysis includes consideration of standard maneuver efficiencies based on thruster plume interference and cant angles.

Figure 9:
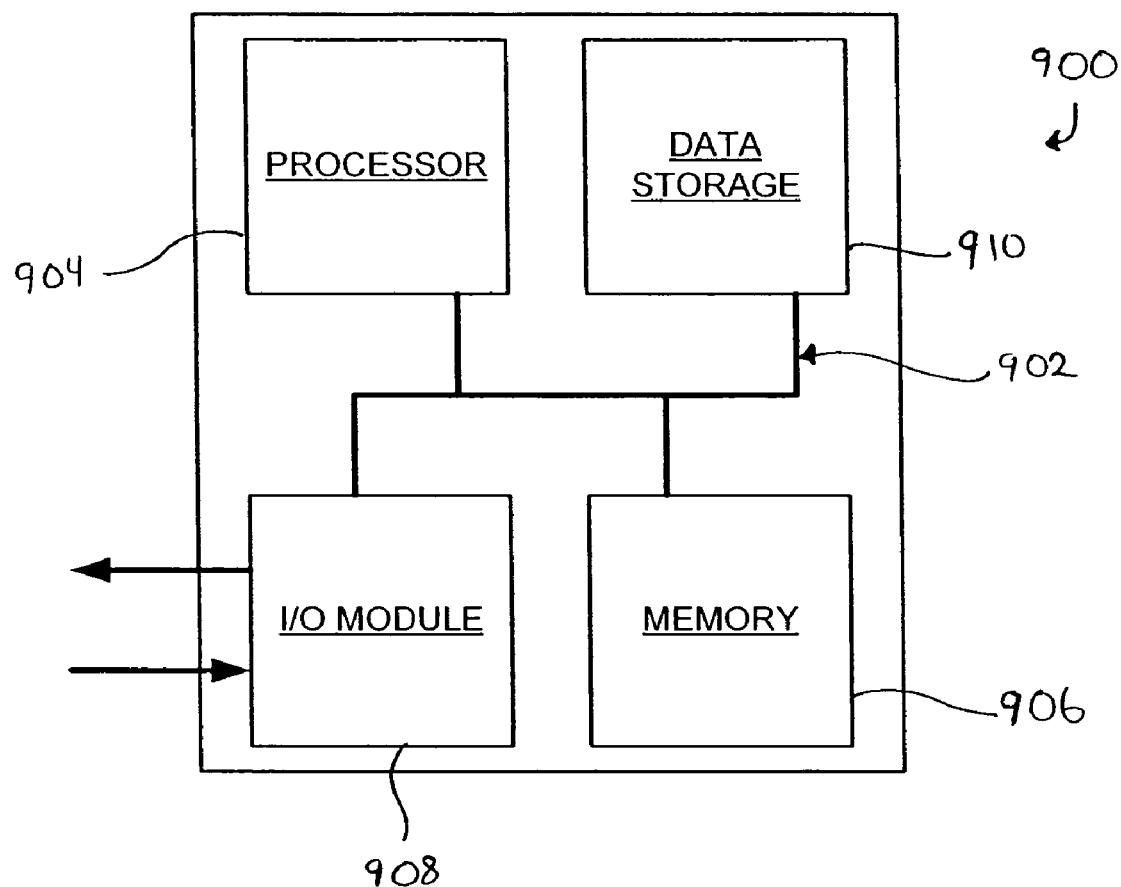
FIG. 9 is a block diagram that illustrates a computer system upon which an embodiment of the present invention may be implemented.

FIG. 9 is a block diagram that illustrates a computer system 900 upon which an embodiment of the present invention may be implemented. Computer system 900 includes a bus 902 or other communication mechanism for communicating information, and a processor 904 coupled with bus 902 for processing information. Computer system 900 also includes a memory 906, such as a random access memory ("RAM") or other dynamic storage device, coupled to bus 902 for storing information and instructions to be executed by processor 904. Memory 906 may also be used for storing temporary variable or other intermediate information during execution of instructions to be executed by processor 904. Computer system 900 further includes a data storage device 910, such as a magnetic disk or optical disk, coupled to bus 902 for storing information and instructions.

Computer system 900 may be coupled via I/O module 908 to a display device (not illustrated), such as a cathode ray tube ("CRT") or liquid crystal display ("LCD") for displaying information to a computer user. An input device, such as, for example, a keyboard or a mouse may also be coupled to computer system 900 via I/O module 908 for communicating information and command selections to processor 904.

According to one embodiment of the invention, optimizing the stationkeeping fuel consumption of a satellite constellation having a plurality of satellites is provided by a computer system 900 in response to processor 904 executing one or more sequences of one or more instructions contained in memory 906. Such instructions may be read into memory 106 from another computer-readable medium, such as data storage device 910. Execution of the sequences of instructions contained in main memory 906 causes processor 904 to perform the process steps described herein. One or more processors in a multi-processing arrangement may also be employed to execute the sequences of instructions contained in memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including, but not limited to, non-volatile media and volatile media. Non-volatile media include, for example, optical or magnetic disks, such as data storage device 910. Volatile media include dynamic memory, such as memory 906. Common forms of computer-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A method for optimizing stationkeeping fuel consumption of a satellite constellation having a plurality of satellites, each satellite having a corresponding orbit, the method comprising:
    a first generating step of generating a plurality of initial ascending node data sets, each initial ascending node data set including an initial right ascension of ascending node ("RAAN") value for each orbit in the constellation, each initial RAAN value within each initial ascending node data set being separated from adjacent RAAN values by at least one predetermined separation angle, and the initial RAAN values within each initial ascending node data set being separated from the initial RAAN values within an adjacent initial ascending node data set by a first step size;
    a second generating step of generating a plurality of RAAN drift rates, each RAAN drift rate being separated from an adjacent RAAN drift rate by a second step size;
    a calculating step of calculating, for each possible data combination that includes one of the plurality of initial ascending node data sets and one of the plurality of RAAN drift rates, a fuel consumption value for each satellite in the constellation corresponding to the amount of fuel required to correct for orbital perturbations and to maintain the at least one predetermined separation angle between the orbits during a predetermined mission time period, the fuel consumption value for each satellite in the constellation being stored in a fuel consumption data set corresponding to the respective data combination;
    a determining step of determining, for each fuel consumption data set corresponding to each respective data combination, a maximum fuel consumption value from the plurality of fuel consumption values in the fuel consumption data set;
    a selecting step of selecting, from the maximum fuel consumption values determined for all data combinations, the data combination corresponding to a lowest maximum fuel consumption value in comparison to all other maximum fuel consumption values, and
    a placing step of placing each of the plurality of satellites in the satellite constellation in the corresponding orbit based upon the selected data combination.

2. The method of claim 1, wherein the at least one predetermined separation angle is selected so that the satellites in the constellation share a single ground track.

3. The method of claim 1, wherein the at least one predetermined separation angle is determined by dividing 360° by the number of satellites in the constellation.

4. The method of claim 1, wherein the plurality of RAAN drift rates are generated by estimating a RAAN drift rate for one of the orbits, and iteratively adding and/or subtracting the second step size from the estimated RAAN drift rate.

5. The method of claim 1, wherein the calculating step includes modeling orbital perturbations affecting the RAAN drift rate of each satellite, and calculating the fuel consumption value for each satellite required to maintain the RAAN drift rate of each satellite.

6. The method of claim 1, wherein the calculating step includes using an orbital dynamics modeling step which calculates orbital perturbations for each satellite.

7. The method of claim 1, wherein the fuel consumption values corresponding to the data combination selected in the selecting step allow the plurality of satellites to maintain the RAAN drift rate of the data combination for the predetermined mission time period.

8. The method of claim 1, wherein the selecting step includes selecting from the maximum fuel consumption values determined for all data combinations, the data combination corresponding to a lowest total fuel consumption value of the data combinations having a lowest maximum fuel consumption value.

9. The method of claim 1, wherein the placing step comprises directly injecting one or more of the plurality of satellites in the satellite constellation into the corresponding one or more orbits using one or more launch vehicles.

10. The method of claim 1, wherein the placing step comprises maneuvering one or more of the plurality of satellites in the satellite constellation into the corresponding one or more orbits from a different one or more transfer orbits.

11. A computer-readable medium carrying one or more sequences of instruction for optimizing stationkeeping fuel consumption of a satellite constellation having a plurality of satellites, each satellite having a corresponding orbit, wherein the execution of the one or more sequences of instructions by one or more processors causes the one or more processors to perform the steps of:

generating a plurality of initial ascending node data sets, each initial ascending node data set including an initial right ascension of ascending node ("RAAN") value for each orbit in the constellation, each initial RAAN value within each initial ascending node data set being separated from adjacent RAAN values by at least one predetermined separation angle, and the initial RAAN values within each initial ascending node data set being separated from the initial RAAN values within an adjacent initial ascending node data set by a first step size;

generating a plurality of RAAN drift rates, each RAAN drift rate being separated from an adjacent RAAN drift rate by a second step size;

calculating, for each possible data combination that includes one of the plurality of initial ascending node data sets and one of the plurality of RAAN drift rates, a fuel consumption value for each satellite in the constellation corresponding to the amount of fuel required to correct for orbital perturbations and to maintain the at least one predetermined separation angle between orbits during a predetermined mission time period, the fuel consumption value for each satellite in the constellation being stored in a fuel consumption data set corresponding to the respective data combination;

determining, for each fuel consumption data set corresponding to each respective data combination, a maximum fuel consumption value from the plurality of fuel consumption values in the fuel consumption data set;

selecting, from the maximum fuel consumption values determined for all data combinations, the data combination corresponding to a lowest maximum fuel consumption value in comparison to all other maximum fuel consumption values; and placing each of the plurality of satellites in the satellite constellation in the corresponding orbit based upon the selected data combination.

12. The computer-readable medium of claim 11, wherein the at least one predetermined separation angle is selected so that the satellites in the constellation share a single ground track.

13. The computer-readable medium of claim 11, wherein the computer-readable medium is a data signal embodied in a carrier wave.

14. The computer-readable medium of claim 11, wherein the number of initial ascending node data sets is equal to the at least one predetermined separation angle divided by the first step size.

15. The computer-readable medium of claim 11, wherein the plurality of RAAN drift rates are generated by estimating a RAAN drift rate for one of the orbits, and iteratively adding and/or subtracting the second step size from the estimated RAAN drift rate.

16. The computer-readable medium of claim 11, wherein the calculating step includes modeling orbital perturbations affecting the RAAN drift rate of each satellite, and calculating the fuel consumption value for each satellite required to maintain the RAAN drift rate of each satellite.

17. The computer-readable medium of claim 11, wherein the calculating step includes a modeling step which calculates orbital perturbations for each satellite.

18. The computer-readable medium of claim 11, wherein the fuel consumption values corresponding to the data combination selected in the selecting step allow the plurality of satellites to maintain the RAAN drift rate of the data combination for the predetermined mission time period.

19. The computer-readable medium of claim 11, wherein the selecting step includes selecting from the maximum fuel consumption values determined for all data combinations, the data combination corresponding to a lowest total fuel consumption value of the data combinations having a lowest maximum fuel consumption value.

20. The computer-readable medium of claim 11, wherein the placing step comprises directly injecting one or more of the plurality of satellites in the satellite constellation into the corresponding one or more orbits using one or more launch vehicles.

21. The computer-readable medium of claim 11, wherein the placing step comprises maneuvering one or more of the plurality of satellites in the satellite constellation into the corresponding one or more orbits from a different one or more transfer orbits.

* * * * *